United States Patent [19]

Blood

[11] 3,870,934

[45] Mar. 11, 1975

[54] WEB TENSION CONTROLLER

[76] Inventor: Charles H. Blood, 149 Gregory Hill Rd., Rochester, N.Y. 14620

[22] Filed: Dec. 14, 1973

[21] Appl. No.: 425,053

[52] U.S. Cl. .................................. 318/7, 242/75.51
[51] Int. Cl. ......................... H02p 5/46, B65h 77/00
[58] Field of Search .................. 318/6, 7; 242/75.51

[56] References Cited

UNITED STATES PATENTS 3,079,538 2/1963 Yamashita ............................. 318/7
3,606,201 9/1971 Petusky............................... 318/7 X

*Primary Examiner*—T. E. Lynch

[57] ABSTRACT

Apparatus for controlling the tension in a web transported between first and second reels, first and second drive motors being mechanically coupled to the first and second reels, respectively, to effect a direct reel-to-reel drive whereby the web is transported therebetween. The current drawn by the armature of the first motor, proportional to the torque generated thereby, is monitored and applied to the armature of the second motor as a biasing current, the polarity of which is determined by the direction in which the web is unwound from the second reel. The biasing current provides a reverse torque to the second motor whereby the rotation of the second motor is in a first direction when the web is unwound from the second reel in a second direction and provides a torque to the second motor whereby the rotation of the second motor is in a second direction when the web from the second reel is unwound in a first direction whereby web tension is controlled.

14 Claims, 5 Drawing Figures

WEB TENSION CONTROLLER

BACKGROUND OF THE INVENTION

In various applications requiring operations on a web of material, a web must be transported past an operating station, usually from a web supply to a web take-up mechanism. The web of material may assume diverse configurations dependent upon the particular use thereof and the operations performed thereon. Thus, the web may comprise a storage tape upon which information is recorded and retrieved, such as magnetic tape, paper tape, or the like; a microfilm strip; a paper web or any other material disposed in web form.

Prior art transport devices, especially those utilizing storage tape for the web medium, have utilized a driven capstan adapted for bi-directional operation to pull the tap from a supply reel to a take-up reel. A reversible motor mechanically coupled to the capstan is controlled by a servo system to dictate the direction of travel of the tape, to maintain s substantially constant linear velocity of the tape through the processing station, to effect speed changes where required or upon command and to introduce substantial accelerations to the transported tape, e.g., during start and stop operations. For most, if not all, of the foregoing controlled operations, it is necessary that a substantially constant tension be maintained in the tape, or at least that portion of the tape extending through the processing station, to minimize the errors attending the recording and retrieval of information. The resulting tape tension achieved in capstan drive tape transport systems has generally been adequate. Desirable improvements in the maintenance of constant tape tension have been obtained by employing a vacuum column of tape buffer intermediate the supply reel and take-up reel.

Although capstan drive tape transport systems have provided acceptable tape tension characteristic the complexity of these systems have encouraged the prior art to seek tape transport systems which do not utilize a temporary tape loop storage means between the two reels, as required in the capstan system described above or those prior art systems using a pinch roller mechanism, multiple loop tension arms or vacuum chambers. Prior art systems have been implemented to provide motors to directly drive the supply reel and the take-up reel, thereby eliminating the tape drive capstan while maintaining substantially constant tape tension intermediate the supply and take-up reels. For example, U.S. Pat. No. 3,606,201 discloses a system for maintaining a substantially constant tape tension in direct drive reel-to-reel systems by utilizing an electromechanical transducer interposed in the tape transport path and responsive to the passage of tape therepast to sense variations in tape tension and to permit appropriate compensation in response thereto.

A problem in the prior art web transport systems which has yet to be solved is the situation in which the web may be unwound from the supply reel in either of two modes. For example, if the information to be read from the web is wound on the supply reel face up (i.e., facing towards the outer periphery of the reel), the reverse torque applied to the supply reel to maintain constant tension in the web must be opposite in direction to the reverse torque applied to the supply reel if the information to be read would be face down (i.e., facing towards the inner hub of the reel) on the supply reel. This situation may occur when the web material is microfilm, the processing station having the capability of processing the recorded information irrespective of the film surface upon which information is recorded.

SUMMARY OF THE PRESENT INVENTION

The present invention provides method and apparatus for controlling the tension in a web transported between first and second reels, first and second drive motors being mechanically coupled to the first and second reels, respectively, to effect a direct reel-to-reel drive whereby the web is transported therebetween. The current drawn by the armature of the first motor, proportional to the torque generated thereby, is monitored and applied to the armature of the second motor as a biasing current, the polarity of which is determined by the direction in which the web is unwound from the second reel. The biasing current provides a reverse torque to the second motor whereby the rotation of the second motor is in a first direction when the web is unwound from the second reel in a second direction and provides a torque to the second motor whereby the rotation of the second motor is in a second direction when the web from the second reel is unwound in a first direction whereby web tension is controlled.

It is an object of the present invention to provide method and apparatus for controlling the tension of a web transported from a first reel to a second reel whereby the polarity of the biasing current supplied to a motor driving said first reel is controlled, the biasing current polarity being dependent upon the direction in which the web is unwound from said first reel.

It is a further object of the present invention to provide method and apparatus for controlling the tension of a web transported from a first reel to a second reel whereby the polarity of the biasing current supplied to a motor driving said first reel is controlled, the biasing current polarity being dependent upon the direction in which the web is unwound from said first reel and including apparatus which inhibits and operator from operatively coupling a web from the first reel to the second reel unless the polarity of the biasing current supplied to said motor corresponds to the direction in which the web is unwound from said first reel.

It is still an object of the present invention to provide method and apparatus for maintaining substantially constant the torque output from a motor driving a take-up reel in a web transport system wherein a web is transported between a supply reel and said take-up reel.

It is a further object of this invention to provide method and apparatus for maintaining substantially constant the torque output of a motor driving a first reel in a web transport system wherein a web is transported between a second reel and said first reel, by applying to the drive motor of one of the reels a biasing current that is directly proportional to the torque applied to the other reel, the polarity of said biasing current being determined by the direction in which the web is unwound from said second reel.

BRIEF DESCRIPTION OF THE DRAWINGS

For a better understanding of the invention as well as other objects and further features thereof, reference is made to the following description, which is to be read in conjunction with the accompanying drawings wherein.

DESCRIPTION OF THE PREFERRED EMBODIMENT

Figure 1:
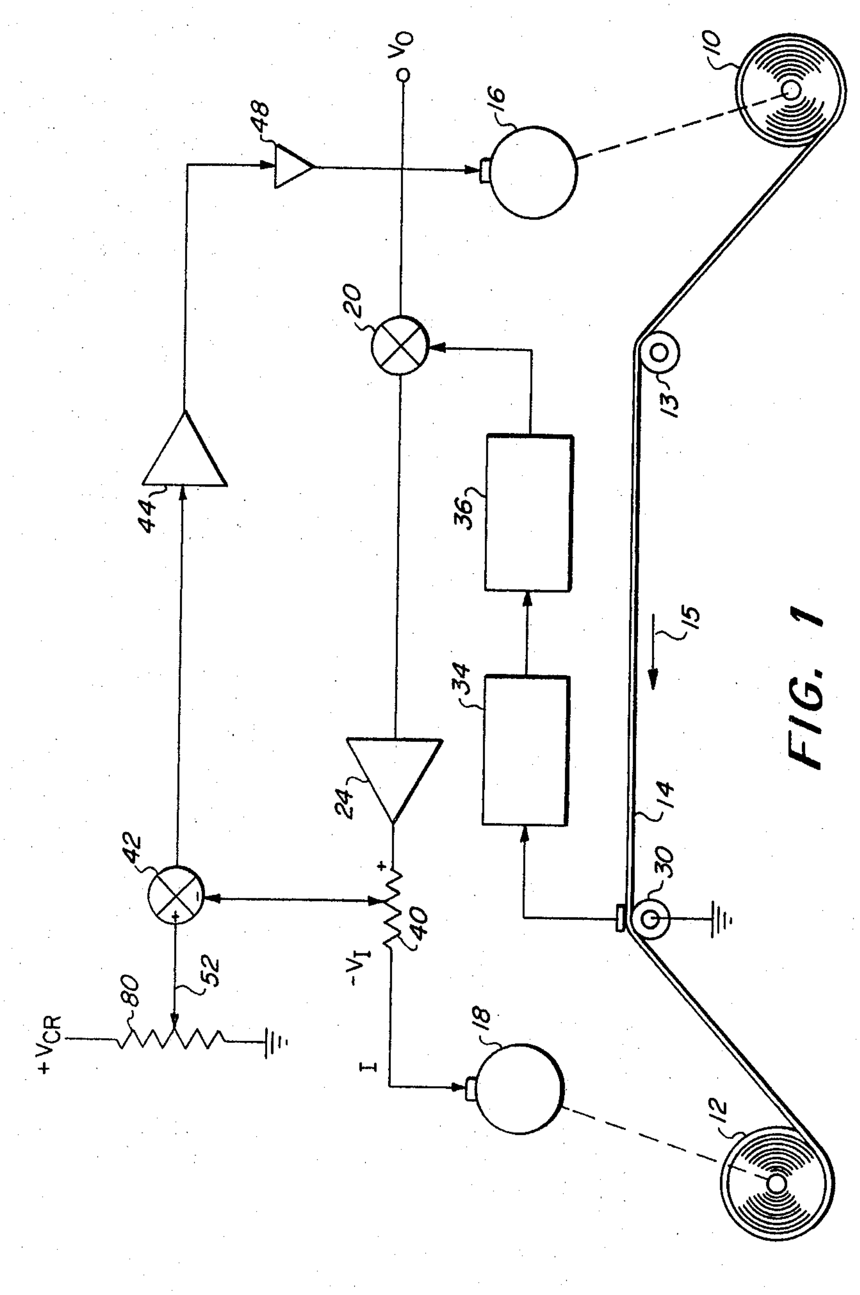
FIG. 1 illustrates a web transport apparatus in which the apparatus of the present invention may be utilized.

Referring now to FIG. 1, a web transport system in which the present invention may be utilized is illustrated. It should be noted that the invention may be utilized in any web transport system wherein the polarity of the biasing current is necessarily dependent on the direction in which the web is unwound from a supply reel. The web transport system illustrated comprises first and second reels 10 and 12, web 14 and drive motors 16 and 18. Web 14 may comprise any suitable material upon which operations are performed, such as information storage tape, microfilm, a paper web, or the like. The web may be adapted for bi-directional transport through a processing station (not shown) although in the system disclosed herein the processing is preferably accomplished in one direction, such as in the direction of arrow 15.

As illustrated, the web is transported between reels 12 and 10. Depending upon the direction of transport, the web is paid out from a supply reel and received on a take-up reel. Thus, if the web is transported from reel 10 to reel 12, for example, the reel 10 may be designated the supply reel and the reel 12 may be designated the take-up reel. Conversely, when the direction of web transport is reversed, i.e., in a rewind mode, such that web 14 is paid out from reel 12, for example, then reel 12 may now be designated the supply reel and reel 10 is designated the take-up reel. Therefore, it is readily appreciated that the designations "supply reel" and "take-up reel" are not fixed to identify specific components of the illustrated apparatus but, on the contrary, conveniently describe the relative functions of reels 10 and 12 when web 14 is transported therebetween in a first or second direction.

Motors 16 and 18, which may be d-c motors, are mechanically coupled to reel 10 and 12, respectively, and are adapted to respond to the selective energization thereof to exert a rotational force on the reel coupled thereto to drive said coupled reel. Reel 12 is adapted to rotate in a clockwise direction when motor 18 is appropriately energized to thus function as a take-up reel. Hence, the driving of reel 12 by motor 18 results in a pulling of the web 14 from reel 10 to reel 12, over idler 13 and a corresponding rotation of reel 10. Conversely, the direction of web transport may be reversed, for example, in a rewind mode, when motor 16 is energized to drive reel 10 in a counter-clockwise rotational direction. The energization of motor 16 causes reel 10 to function as a take-up reel and results in a pulling of the web from reel 12 to reel 10 and a corresponding rotation of reel 12. It should be appreciated that, if desired, motors 10 and 12 may be concurrently energized to cooperate in the transporting of the web therebetween. If the motors are, for example, conventional d-c motors, the direction of rotation thereof may be dependent upon the polarity of the energy supplied thereto.

To direction and speed of transport of web 14 is a function of the operation of motors 10 and 12, the motors being regulated by the control system comprised of the signal $V_O$, error signal generating means 20, amplifying means 24, high resolution shaft encoder 30, pulse shaper 34 and one shot 36. $V_O$ is a d-c reference signal admitting of a magnitude representing a desired web velocity and of a polarity representing a desired direction of web transport. For example, a reference signal admitting of positive polarity may be assumed to represent forward web drive such that motor 18 is supplied with d-c energy. Of course, it is appreciated that the foregoing assumptions of polarity are not intended to be limiting and the reference signal may admit of any polarity desired to represent the particular directions of web transpotation. The magnitude of the $V_O$ reference signal 14 may be derived from an external device, corresponding to a desired web speed.

Error signal generating means 20 is coupled to reference signal $V_O$ and to the output of shaft encoder 30 (via pulse shaper 34 and one shot 36). The error signal generating means is adapted to generate an output signal, hereafter designated an error signal, proportional to the difference between the input signals applied thereto. Error signal generating means 20 may thus comprise a conventional differencing or subtracting circuit such as a conventional differential amplifier, an algebraic resistance combining network, an operational amplifying circuit or the like.

Error signal generating means 20 is coupled to motor 18 by amplifying means 24. Amplifying means 24 may comprise a motor driving circuit coupled to the armature of motor 18 to supply the armature windings with energizing current proportional to the output of error signal generating means 20. It should be noted that a separate, conventional amplifier may be interposed between error signal generating means 20 and amplifier 24 to increase the magnitude of the output of the former to supply motor 18 with sufficient operating energy compatible therewith. More particularly, amplifying means 24 is adapted to respond to a unidirectional signal supplied thereto by error signal generating means 20. For the purpose of the present description, amplifying means 24 may be assumed to respond to a positive signal, such as a positive d-c signal, to supply positive energizing current, e.g., direct current, to motor 18. It is, of course, understood that amplifying means 24 may be responsive to a negative signal. Additionally, the output of amplifying means 24 is coupled to the armature windings of motor 16 via the series connection of error signal generating means 42, and power amplifying means 44. Amplifying means 44 may be similar to aforementioned amplifying means 24.

The operation of the web transport control sytem illustrated in FIG. 1 will now be described. Let it initially be assumed that the transported web 14 is to be driven in a first, or forward direction from reel 10 to reel 12. Accordingly, reference signal $V_O$ produced a positive d-c signal admitting of a predetermined magnitude. (Note that means may be provided to accelerate the web transport 14 to a predetermined speed prior to normal transport operation. However, the operation described hereinafter would be essentially similar.) If motor 16 and motor 18 are initially at rest, the voltages supplied to error signal generating means 20 via shaft encoder 30 is essentially zero. Accordingly, error signal generating means 16 is provided with the postive d-c signal supplied thereto by reference signal $V_O$. The difference between the signal supplied by reference signal $V_O$ and the output of shaft encoder 30, the error signal, is recognized as being essentially the positive d-c signal produced by $V_O$. The positive d-c error signal is amplified by amplifying means 24 which operates upon the amplified positive d-c error signal supplied thereto to generate a positive direct current of sufficient magnitude to energize motor 18. It may be appreciated that the energizing current now supplied to motor 18 by amplifying means 24 admits of a maximum amplitude. Amplifying means 24 corrects the error voltage at its input to a proportional, amplified current I at its output. Current I flows through a resistor 40, producing a voltage drop $V_I$ thereacross. A portion of the amplified positive d-c error signal $V_I$ produced by amplifying means 24 is coupled to error signal generating means 42 via lead 27. $V_I$ is compared with a reference signal $V_{CR}$ generated at the output of the adjustable tap 52 of potentiometer 50, bias potential $V_{CC}$ being applied as an input to potentiometer 50. The position of adjustable tap 52 is selected to correspond to a desired torque output from drive motor 18. Since $V_I$ is directly related to the torque output of motor 18, the error signal produced by error signal generating means 42 represents the difference between the desired torque and the actual torque value. As with error signal generating means 20, error signal generating means 42 is selected to provide an output which corresponds to the difference in amplitude between the signals applied to the input. The error signal from error signal generating means is applied to power amplified means 44 which converts the voltage error signal into an amplified current error signal which is applied to the armature of motor 16 viainverter 48. Inverter 48 inverts the polarity of the current output of amplifying means 44 to apply a reverse energizing current to the armature of motor 16. The supply of positive energizing current to motor 18 initiates the operation thereof resulting in the rotation of the armature of motor 18 and reel 12 coupled thereto. As the motor is energized, the angular velocity of reel 12 is increased and web 14 is transported from reel 10 to reel 12. As the web is paid out from reel 10 to 12, the armature of motor 16, which is mechanically coupled to the reel 10, is rotated in a corresponding direction, due to the reverse energizing current supplied to its armature which direction is opposite to that normally rotated when said motor 10 is energized. Note that alternate techniques for providing a reverse energizing current to the armature of motor 16 may be provided. For example, if the polarity of current I is positive and the output of error signal generating means 42 is similarly positive, power amplifying means 44 can be selected to provide a polarity inversion in addition to providing gain. Inverter 48, in this situation, may be eliminated. The aforementioned is illustrated of possible alternatives which may be utilized to provide a reverse biasing current, proportional to the positive energizing current supplied to the armature of the take-up motor 18, to the armature of supply motor 16 whereby the rotation of the take-up motor is opposed, thereby providing control of web tension, which as will be explained in more detail hereinafter, allows the torque output of motor 18 to remain substantially constant.

It is recognized that as the armature of motor 18 is energized, reel 12 is caused to rotate and the web is caused to move in the direction of arrow 15. Consequently, a digitial voltage proportional to the web velocity is generated by shaft encoder 30. Shaft encoder 30 generates a predetermined number of pulses per revolution; thus the higher the revolutions per second of shaft encoder 30, the higher the number of pulses per second. Since the radius of the shaft encoder 30 is obviously constant, the train of pulses is directly proportional to web velocity.

The train of pulses generated by shaft encoder 30 are changed by single shot 34 into constant width pulses of a predetermined duty cycle. The output of single shot 34 is coupled to pulse shaper 36, functioning also as a low pass filter, to generate a d.c. voltage level proportional to web velocity. The output of pulse shaper 36 is amplitude compared with positive signal $V_O$ in error signal generating means 20. The output of one-shot 36 is amplitude compared with positive signal $V_O$ in error signal generating means 20.

Error signal generating means 20 generates an error signal proportional to the difference between the reference voltage $V_O$ applied thereto and the output of shaft encoder 30. Hence, the error signal applied to amplifying means 24 is indicative of the deviation between the actual velocity of the transported web and the desired velocity thereof.

If it is assumed that the transported web has not yet attained the desired velocity thereof, the comparison process continues and power amplifier 24 continues to generate an error current necessary to bring the velocity of web 14 to the desired velocity. Hence, the error signal is a positive d-c signal. More particularly, since the velocity of web 14 is now approaching the desired velocity thereof, it is recognized that the magnitude of the energizing current supplied to motor 18 need not be as great as that of the energizing current previously supplied thereto. Nevertheless, since the energizing current is a direct function of the error signal produced by error signal generating means 20, the angular velocity of reel 10 is increased to further approach the desired web velocity thereof and, consequently, to reduce the magnitude of the generated error signal.

The foregoing operation is repeated until web 14 is transported at a velocity corresponding to the desired velocity represented by the magnitude of the reference signal $V_O$. When such desired velocity is actually attained, the error signal generated by error signal generating means 20 is reduced substantially to zero and amplifying means 24 supplies motor 18 with a positive d-c energizing current admitting of a sufficient magnitude to maintain the motor at the proper angular velocity of drive the web 14 accordingly.

As will be described hereinafter, the purpose of amplifying means 44 and inverter 48 is to supply reverse biasing current to motor 16 when motor 18 is energized to adjust the tension in the web transported from reel 12 to reel 10. This is accomplished while maintaining a constant torque load at motor 18 and avoiding slippage between the web and shaft encoder 30. As is apparent from FIG. 1, ther reverse biasing current is proportional to the current supplied to motor 18.

The foregoing explanation has described the operation of the illustrated apparatus when motor 18 is energized to drive web 14 from reel 10 to reel 12. The system as described in not concerned with driving the web in a reverse direction for information processing purposes, albeit a rewind operation can obviously be performed. Therefore, a description of the system in a reverse mode of operation is not set forth herein.

In the foregoing description, the polarity of reference signal $V_O$, as well as the polarities of the energizing currents supplied to motors 16 and 18, respectively, are understood to be merely exemplary. Consequently, forward web drive may be initiated by a negative $V_O$ reference signal. Likewise, amplifying means 24 and 44 may be responsive to negative signals supplied thereto to thus supply respective motors 18 and 16 with suitable d-c energizing currents. Furthermore, each of the illustrated amplifying means may, if desired, be conventional inverting amplifiers to produce correspondingly poled amplified signals.

Torque Output Control

In the system described, it is preferred to maintain substantially constant the torque generated by the motor driving the take-up reel and additionally transport the web at a constant linear velocity even as the effective radii of reels 10 and 12 vary. It is known that the web tension force F is a function of the torque T exerted on a reel and the effective radius of the reel *r* such that $F=T/r$. Since the effective radius *r* varies as the web is paid out (or received), a constant torque T will require varying the web tension. As set forth previously, the present invention, by allowing the torque of the take-up motor to remain constant, the gain of the take-up motor need not be varied in order to keep the same web velocity accuracy.

This may be shown by the following description. The constant rate servo is an analog system in contradistinction to prior art phase lock loop systems. Therefore, the velocity accuracy is dependent upon the gain of the system. The difference between the reference and the actual speed amplified by a factor K (gain), i.e., the gain of amplifier 24, gives the necessary power to overcome the load which is only friction and tension on the web (inertia is not a factor since the system is in a constant rate mode of operation).

If the gain factor K is increased, then the error required to drive motor 18 gets smaller in order to put the same amount of current to the motor 18 to overcome the load which is the same. The ideal case, of course, is when the gain K is infinity. This requires zero error to drive the system and zero error means a velocity equal to the reference (ideal). Since infinity gains do not exist and since high gain hinders the stability of the system, the best compromise is to have a gain which is not very high. Therefore, a small error may be present, but that error is constant, and it can be treated as an offset. This is true only if the load of the system stays constant. The way the torque load of the system is maintained constant is by decreasing the tension of the web as the radius increases, which is the procedure utilized by the present invention. Thus, if a specific velocity accuracy (for example, a 0.1% speed change) is required, the present system would require a relatively small gain to keep the error small enough and the velocity within 0.1% change from empty reel to full reel.

The supply motor 16 applies proper tension to web 14 to avoid slippage between web 14 and shaft encoder 30, the shaft encoder generally having a relatively low frictional torque. The frictional force required between the web 14 and the shaft encoder 30 in order to avoid slippage is dependent on four factors: (1) co-efficient of friction between web 14 and idler 13; (2) angle of wrap of web 14 around shaft encoder 30; (3) tension of web 14 on both sides of shaft encoder 30; and (4) frictional torque of shaft encoder 30. Since the shaft encoder frictional torque is relatively low, it can be shown that the force developed by the friction between shown that the force developed by the friction between web 14 and shaft encoder 30 does not need to be large in order to drive the shaft encoder 30 and avoid slippage.

It is known that the torque developed by a motor, such as a d.c. motor, is directly proportional to the armature current I flowing therein such that $T=AI$ wherein A is a motor constant. Hence, if a portion of the current is sensed and compared with a reference voltage corresponding to a desired or predetermined torque level, the output of the comparator (voltage) can be converted to a current signal of the reverse polarity and coupled to the supply motor whereby necessary reverse torque is applied to reel 10. The reverse torque thereafter adjusts the web tension such that the current to the take-up motor is maintained at a constant, selected value. It should be noted at this time that the phrase "constant tension" wherever utilized defines an essentially instantaneous tension value since the web tension will vary, as set forth hereinabove, over a period of time as the web is wound on take-up reel 10.

In the system described in FIG. 1, the current supplied to the motor 16 provides a reverse torque to oppose the clockwise rotation thereof. Hence, tension is exerted on the web 14 and is maintained substantially constant by the current to motor 16 as the effective radius of reel 10 decreases (effective radius of reel 12 increases).

Amplifying means 24 and 44 are adapted to amplify the respective signals applied thereto by a predetermined constant factor *k*. The amplifying means exhibit substantially linear amplification functions and predetermined constant factor *k* may be greater than or less than unity. Amplifying means 24 and 44 are adapted to be compatible with error signal generating means 20 and 42, respectively. Hence, if the signals provided by the error signal generating means are voltage signals, the amplifying means may be voltage amplifiers to supply the motor means coupled thereto with amplified voltages directly proportional to the voltage signals provided by the respective error signal generating means. Similarly, if the amplifying means are supplied with current signals, said amplifying means may be current amplifiers to supply the motors coupled thereto tith amplified currents directly proportional to the current signals provided by the respective error signal generating means. In the preferred embodiment shown in FIG. 1, amplifying means 24 and 44 generate an amplified current in response to an applied voltage signal.

In operation, amplifying means 24 or 44 is adapted to derive a current signal directly proportional to the torque generated by take-up motor 18, which derived signal is applied as a reverse biasing current to the supply reel drive motor 16. The reverse biasing current provides a torque to motor 16 to oppose the clockwise rotation thereof, thus exerting a tension on web 14. The reverse biasing current being directly proportional to the current I drawn by take-up motor 18, acts to provide a reverse torque to motor 16, thereby controlling the tension of web 14 whereby the current I constant is maintained constant thereby providing a constant torque output regardless of the web radius of the reel 12.

It is obvious at this point that the speed control and tension control loops of the present invention are simultaneously and cooperatively operative. In particular, as the velocity error generated at the output of error generating means 20 is applied to power amplifier means 24 to increase the motor output torque (current I thereby increasing) the current increase is detected in error signal generating means 42 and applied to motor 16 via power amplifier 44 and inverter 48 whereby the supply motor is driven in a counter-clockwise direction to remove excess current (i.e., torque is maintained constant). This is accomplished by removing tension from the web by reducing the absolute value of the current supplied to the supply motor 16. This allows the take-up motor 18 to accelerate, or drive the web 14 in the direction of arrow 15 more easily, the current required to maintain a given velocity error thereby being reduced.

Figure 2A:
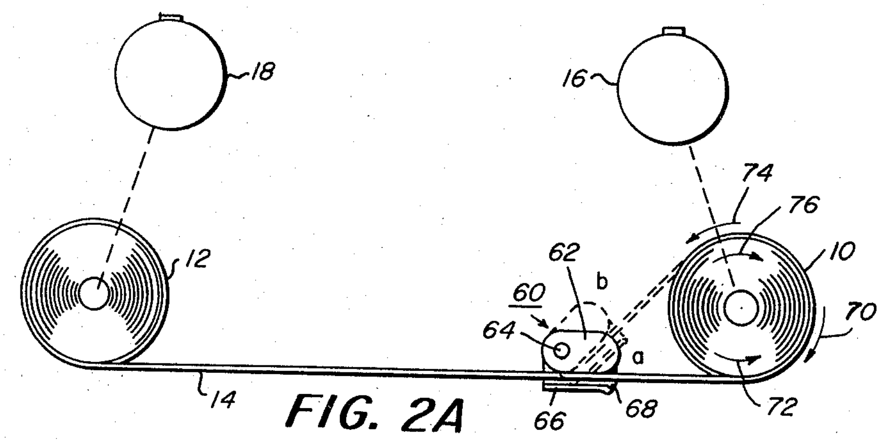
FIGS. 2a and 2b illustrate the mechanical and electrical modifications, respectively, of the apparatus shown in FIG. 1 to provide the web drive control features of the present invention.

Referring now to FIG. 2*a*, the web tension controller of the present invention is shown in simplified form to illustrate the novel features thereof. The aforementioned web tension controller may be utilized with the web transport apparatus shown in FIG. 1 and the corresponding elements in FIGS. 2*a*, 2*b*, 3*a*, and 3*b* have been labeled with like reference numerals. It should be noted that the web tension controller of the present invention may be utilized with other web transport apparatus other than that shown in FIG. 1 and, in particular, with web transport apparatus which utilizes a web which can unwind from the supply reel either in a clockwise or counter-clockwise direction. The controller 60 comprises a rotatable member 62 which pivots about pivot point 64, and a plate member 66 which is affixed to rotatable member 62, the latter being capable of assuming one of two positions, position a shown in solid, and position b shown in phantom.

Web material 14 on reel 10 is, for illustrative purposes, assumed to have information recorded thereon such that the web must be unwound from reel 10 in the clockwise direction, i.e., in the direction of arrow 70, so that the recorded information can be processed. In order to operatively couple the web unwinding from reel 10 to reel 12 (threading the film leader from the supply reel 10 to the take-up reel 12), rotatable member 62 is positioned at *a*. With rotatable member 62 at position *a*, web 14 can be threaded through guide means, or channel 68 formed between the lower edge of member 62 and the upper surface of plate member 66. With web 14 unwinding from reel 10 in the direction of arrow 70, a reverse biasing current is supplied to motor 16 such that a reverse torque is generated thereby, causing reel 10 to rotate in a counter-clockwise direction (direction of arrow 72) and oppose the rotation of motor 18.

If clockwise web 14 is to be unwound from reel 10 in the counter-clockwise direction as indicated by arrow 74, rotatable member 62 must be rotated to position b (indicated in phantom), thereby enabling web 14 to be operatively coupled to reel 12 via guide means 68. With web 14 unwinding from reel 10 in the counter-clockwise direction, a biasing current is supplied to motor 16 such that the torque generated thereby causes reel 10 to rotate in the clockwise direction, indicated by arrow 76.

The biasing current referred to in FIG. 2*a* generates torque in motor 16 which, in the web transport apparatus described in FIG. 1, maintains the torque output of motor 18 at a substantially constant value by adjusting the tension of web 14.

The polarity of the biasing current is, as described hereinabove, dependent on the direction in which web 14 is unwound from the reel 10, thereby providing a web transport apparatus which maintains web tension substantially constant notwithstanding the fact that the web may be unwound from the supply reel in either of two directions.

The schematic diagram shown in FIG. 2*b* implements the controller operation described with reference to FIG. 2*a* such that the torque produced by motor 16 is dependent on the position of rotatable member 62 which, as described hereinabove, is dependent on the direction in which web 14 is unwound from reel 10. In particular, the apparatus shown in FIG. 1 is modified in accordance with the teachings of the present invention such that the output of power amplifier 44 is coupled to a double throw switch 80 comprising contact terminals *c* and *d*, and ganged contact arms 82 and 84. Switch 80 is coupled to rotatable member 62 such that movement of member 62 provides a corresponding movement of contact arms 82 and 84. Contact terminal d of switch 80 is coupled to inverter 48, the output thereof being connected to output lead 86. The output of power amplifier 44 is directly coupled to output lead 86 via contact terminal 80. The output signal appearing on lead 86 is connected to drive motor 16.

In operation, when the tape transport system shown in FIG. 1 is operative and the web is to be unwound from reel 10 in the clockwise direction, controller 60 is positioned at *a*. In this position, contact arms 82 and 84 (FIG. 2*b*) of switch 80 are positioned such that power amplifier 44 is coupled to motor 16 via contact arm 84, terminal d and inverter 48. Thus, the web apparatus is operative in the mode described hereinabove with reference to FIG. 1. If the web material 14 is to be unwound from reel 10 in a counter-clockwise direction, rotatable member 62 is positioned at *b*, shown in phantom in FIG. 2*a*. In this position, contact arms 82 and 84 of switch 80 are positioned such that power amplifier 44 is directly coupled to motor 16 via contact arm 82 and contact terminal *d*. Thus, the output of power amplifier 44 is not inverted and the biasing current applied to motor 16 produces a torque which rotates reel 10 in the clockwise direction, the same direction in which reel 12 is normally rotated.

For the reasons set forth hereinabove with reference to FIG. 1, the circuit described in FIG. 2*b* may take alternative forms, the only requirement being that it be capable of applying a biasing current to the supply motor of a polarity which is dependent on the direction in which the material is unwound from the supply reel.

Figures 2B, 3A:
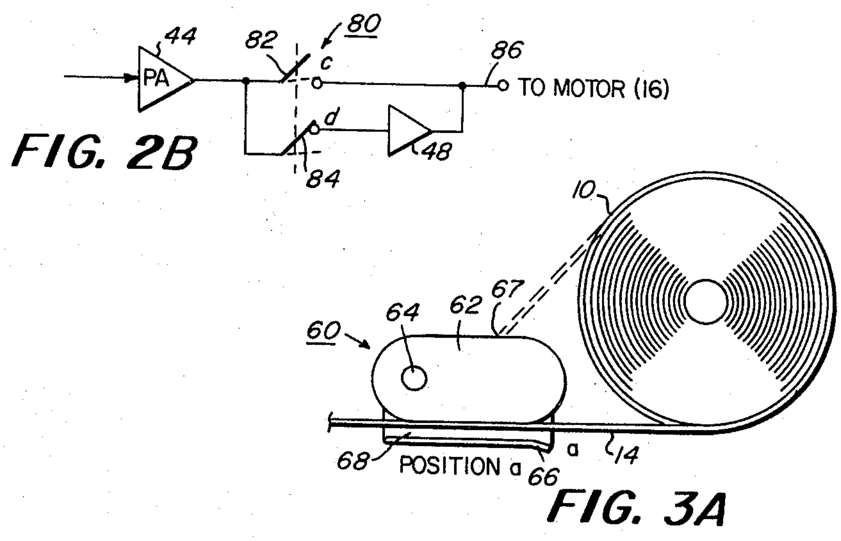
Figure 3B:
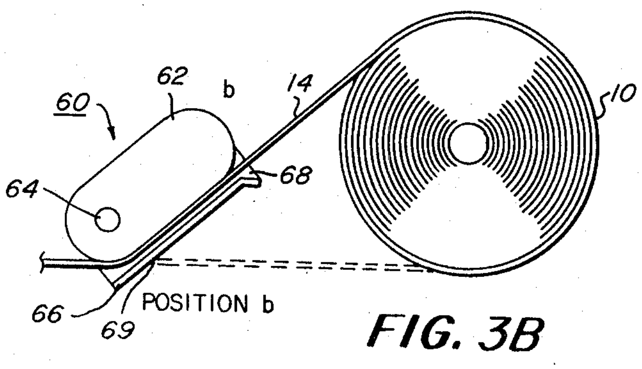
FIG. 3 illustrated in more detail the mechanical features of the present invention.

FIGS. 3*a* and 3*b* illustrate in more detail the mechanical apparatus shown in FIG. 2*a*.

The rotatable member 60 in FIG. 3*a* is shown in position a with the web 14 unwinding in a clockwise direction, and threading through guide means 68 towards take-up reel 12. FIG. 3*b* shows rotatable member 62 in position *b* with web 14 unwinding from reel 10 in a counter-clockwise direction and being directed through guide means 68 towards take-up reel 12.

In the preferred embodiment of the invention, rotatable member 62 is physically located within the system incorporating the web transport apparatus such that threading of the web from the supply reel, through a processing station and onto the take-up reel, would be inhibited unless the member 62 was correctly positioned to correspond to the direction in which web 14 is unwound from reel 10. For example, if rotatable member 62 is at position a (FIG. 3*a*) and an operator attempts to provide a supply reel which requires unwinding in the counter-clockwise direction, the web material 14 (indicated in phantom) interferes with rotatable member 62 and 67 and consequently cannot be threaded through guide means 68 towards take-up reel 12. In a similar manner, if the rotatable member 62 is at position *b* (FIG. 3*b*) and a supply reel is provided which requires unwinding of web 14 in a clockwise direction, the web material (indicated in phantom) will interfere with plate member 66 at 69 which inhibits the operative coupling of web 14 to take-up reel 12.

Therefore, in this embodiment, an operator is inhibited from operating the web transport apparatus unless rotatable member 62 is in the correct position.

As an alternate embodiment, rotatable member 62 would be replaced with a switch member which is not physically located to provide interference to the web as described hereinabove but which requires an operator to adjust the switch position in accordance with the direction of web unwind. However, this latter technique does not provide the additional mechanical inhibit feature described hereinabove which compensates for an operator incorrectly positioning rotatable member 62.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. In an apparatus for controlling the tension in a web being transported from a first reel to a second reel, first and second drive motors being coupled to said first and second reels, respectively, and wherein a signal is generated to control the torque produced by said first drive motor to control the torque produced by said first drive motor to control web tension, the improvement comprising:

means for controlling the polarity of said signal whereby said signal is of a first polarity if said web is unwound from said first reel in a first direction and said signal is of a second polarity if said web is unwound from said first reel in a second direction.

2. The apparatus as defined in claim 1 further including movable means located adjacent said first reel having first and second operative positions, said movable means being in said first operative position when said web is unwound from said first reel in said first direction and being in said second operative position when said web is unwound from said first reel in said second direction.

3. The apparatus as defined in claim 2 wherein said web is inhibited from being operatively coupled to said second reel if said web is unwound from said first reel in said first direction and said movable means is in said second operative position.

4. The apparatus as defined in claim 3 wherein said web is inhibited from being operatively coupled to said second reel if said web is unwound from said first reel in said second direction and said movable means is in said first operative position.

5. A method of controlling the tension in a web being transported from a first reel to a second reel, first and second drive motors being coupled to said first and second reels, respectively, comprising the steps of:

generating a signal to control the torque generated by said first motor to control web tension, and controlling the polarity of said signal whereby said signal is of a first polarity if said web is unwound from said first reel in a first direction and said signal is of a second polarity if said web is unwound from said first reel in a second direction.

6. A method of controlling the tension in a web being transported from a first reel to a second reel, first and second drive motors being coupled to said first and second reels, respectively, comprising the steps of:

deriving a current proportional to the current drawn by said second drive motor, applying said derived current as a biasing current to said first motor to thereby provide a torque to said first motor whereby tension is exerted on said web to maintain the torque output of said second motor substantially constant, and controlling the polarity of said biasing current whereby said biasing current is of a first polarity if said web is unwound from said first reel in a first direction and said biasing current is of a second polarity if said web is unwound from said first reel in a second direction.

7. The method as defined in claim 6 wherein said step of deriving a current comprises the steps of:

generating a voltage signal directly proportional to the current drawn by said second motor, comparing said voltage signal with a reference voltage and generating a signal representing the difference therebetween, said reference voltage corresponding to a predetermined torque output produced by said second motor, and converting said difference signal to said biasing current.

8. Apparatus for controlling the tension in a web transported from a first reel to a second reel comprising:

a first motor operatively coupled to said first reel, a second motor operatively coupled to said second reel, means for deriving a current proportional to the current drawn by said second motor, means for applying said derived current as a biasing current to said first motor to thereby provide a torque to said first motor whereby tension is exerted on said web to maintain the torque output of said second motor at a substantially constant value, and means for controlling the polarity of said biasing current whereby said biasing current is of a fist polarity if said web is unwound from said first reel in a first direction and said biasing current is of a second polarity if said reel is unwound from said first reel in a second direction.

9. The apparatus as defined in claim 8 further including movable means located adjacent said first reel and having first and second operative positions, said movable means being in said first operative position when said web is unwound from said first reel in said first direction and being in said second operative position when said web is unwound from said first reel in said second direction.

10. The apparatus as defined in claim 9 wherein said web is inhibited from being operatively coupled to said second reel if said web is unwound from said first reel in said first direction and said movable means is in said second operative position.

11. The apparatus as defined in claim 10 wherein said web is inhibited from being operatively coupled to said second reel if said web is unwound from said first reel in said second direction and said movable member is in said first operative position.

12. The apparatus as defined in claim 8 wherein said deriving means comprises:

means for generating a voltage signal which is directly proportional to the current drawn by said second motor, means for comparing said voltage signal with a reference voltage and, generating a signal representing the difference therebetween, said reference voltage coresponding to a predetermined torque output produced by said second motor, and means for converting said difference signal to said biasing current.

13. The apparatus as defined in claim 8 wherein said web comprises microfilm.

14. The apparatus as defined in claim 8 further including speed control means coupled to said second motor for supplying a current to said second motor whereby the speed thereof is controlled.

* * * * *

UNITED STATES PATENT OFFICE
CERTIFICATE OF CORRECTION

Patent No. 3,870,934 Dated March 11, 1975

Inventor(s) Charles H. Blood

It is certified that error appears in the above-identified patent and that said Letters Patent are hereby corrected as shown below:

In column 11, lines 43-44, delete the phrase "to control the torque produced by said first drive motor".

In column 12, line 57, delete "frst" and insert --first-- therefor.

In column 14, line 3, delete ",".

Signed and sealed this 10th day of June 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

PATENT NO. : 3,870,934

DATED : March 11, 1975

INVENTOR(S) : Charles H. Blood

It is certified that error appears in the above-identified patent and that said Letters Patent are hereby corrected as shown below:

In the heading of the printed patent, between lines 3 and 4, insert -- [73] Assignee Xerox Corporation Stamford, Conn. --.

Signed and Sealed this

*twenty-sixth* Day of *August 1975*

[SEAL]

*Attest:*

RUTH C. MASON
*Attesting Officer*

C. MARSHALL DANN
*Commissioner of Patents and Trademarks*